United States Patent [19]
>
> Yin
>
> [11] Patent Number: 4,791,300
>
> [45] Date of Patent: Dec. 13, 1988

[54] MINIATURE GAMMA CAMERA

[75] Inventor: Lo I. Yin, Silver Spring, Md.

[73] Assignee: QTR Corporation, Silver Spring, Md.

[21] Appl. No.: 899,641

[22] Filed: Aug. 25, 1986

[51] Int. Cl.$^4$ ............................................. G01T 1/20
[52] U.S. Cl. ................................ 250/363 R; 250/366; 250/505.1
[58] Field of Search ......... 250/363 R, 363 S, 363 SA, 250/363 SB, 363 SE, 505.1, 370 G, 390 G, 366, 213 VT; 370/155

[56] References Cited

U.S. PATENT DOCUMENTS

| | | |
|---|---|---|
| 2,688,095 | 8/1954 | Andrews . |
| 2,730,566 | 1/1956 | Bartow et al. . |
| 2,871,367 | 1/1959 | Gournay . |
| 3,011,057 | 11/1961 | Anger . |
| 3,048,698 | 8/1962 | Carlson ............................ 250/369 |
| 3,209,201 | 9/1965 | Anger . |
| 3,462,601 | 8/1969 | Sternglass . |
| 3,509,341 | 4/1970 | Hindel et al. ................. 250/363 SR |
| 3,603,828 | 9/1971 | Sheldon . |
| 3,660,664 | 5/1972 | Pasmeg . |
| 3,749,920 | 7/1973 | Sheldon . |
| 3,755,672 | 8/1973 | Edholm et al. . |
| 3,774,031 | 11/1973 | Mallard et al. ...................... 250/503 |
| 3,803,407 | 4/1974 | Anderson . |
| 3,961,191 | 6/1976 | Stoner et al. . |
| 4,142,101 | 2/1979 | Yin . |
| 4,272,678 | 6/1981 | Lange . |
| 4,345,153 | 8/1982 | Yin . |
| 4,360,797 | 11/1982 | Fenimore et al. . |
| 4,404,469 | 9/1983 | Yin . |
| 4,481,419 | 11/1984 | Persyk . |
| 4,506,374 | 3/1985 | Flynn . |

OTHER PUBLICATIONS

Proceedings of the Society of Photo-Optical Instrumentation Engineers, Low Light Level Devices for Science and Technology, vol. 78, Mar. 22-23, 1976, Reston, Virginia, by Jon Tegethoff and Ferd Fender.
*International Symposium on Nuclear Medicine and Related Medical Applications of Nuclear Techniques in Developing Countries,* Vienna, Austria, 26-30, Aug. 1985, "A Miniature Low-Cost Gamma Ray Imaging Device".
NASA Conference Publication 2112, "Proceedings of the Lixiscope Conference", Jul. 1978; *Some Contemplated Improvements to the Prototype Lixiscope,* Dr. Lo I Yin, p. 15.
NASA Conference Publication 2112 "Imaging for Medicine", vol. I: *Nuclear Medicine, Ultrasonics and Thermography,* S. Nudelman & D. D. Patton Eds., Plenum Press, N.Y. 1980, Chapter 4: *A Review of Gamma Camera Technology for Medical Imaging,* by R. E. McKeighen.
*IEEE Transactions on Nuclear Science,* vol. NS-30, No. 1, Feb. 1983; "Application of the Wedge and Strip Anode to Position Sensing with Microchannel Plates and Proportional Counters", by Siegmund et al, pp. 503-507.
Rev. Sci. Instrum. 52(7), Jul. 1981, "Wedge-and-Strip Anodes for Centroid-Finding Position-Sensitive Photon and Particle Detectors", by C. Martin et al; pp. 1067-1074.
*IEEE Transactions on Nuclear Science,* vol. NS-25, No. 2, Apr. 1978; "Channel Electron Multipliers, Properties, Development and Applications", P. Lecomte et al, pp. 964-973.

Primary Examiner—Janice A. Howell
Attorney, Agent, or Firm—Robert E. Bushnell

[57] ABSTRACT

A completely portable, rugged camera for providing in real time, visual light images of extended objects emitting low energy X-ray and gamma-ray photons. Collimated radiation eminating from extended objects such as internal anatomical organ structures which have absorbed low dosages of radio-active isotopes, are filtered through a visible light shield, converted into visible light photons, and, alternatively magnified or demagnified while spatial orientation is maintained. The visible light photons are subsequently intensified, in one or more cascaded stages, through conversions into electrons, multiplied through micro-channel plate electron multipliers, and reconverted by a phosphor screen to visible light and provide a high spatial resolution visual light image either directly to a viewer or to a device such as an image recorder.

52 Claims, 4 Drawing Sheets

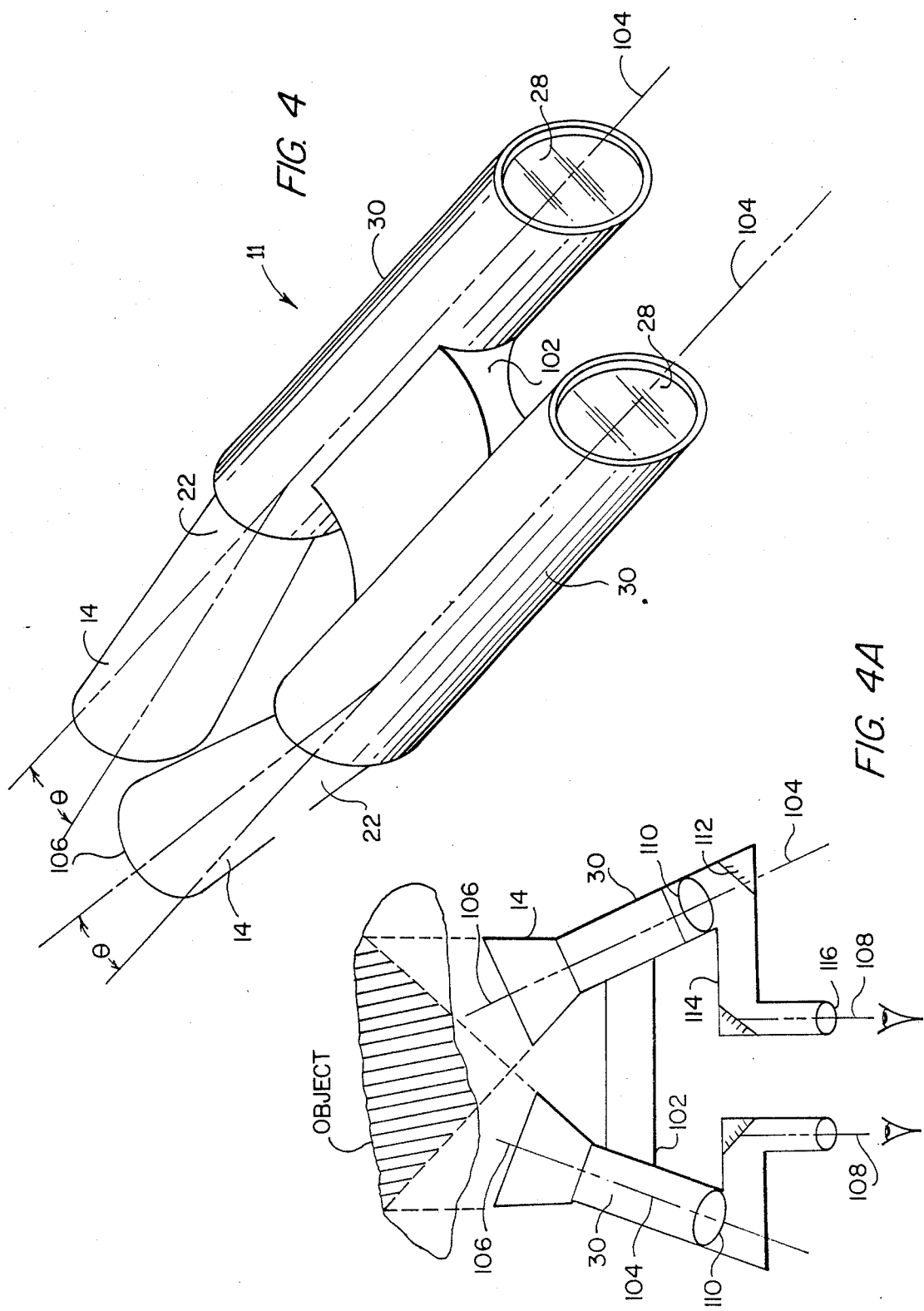

MINIATURE GAMMA CAMERA

TECHNICAL FIELD

The present invention pertains to invisible radiant energy imaging and, more particularly, to methods and apparatus for generating visible images of objects emitting X-rays and gamma-rays.

BACKGROUND ART

The contributions of modern physics have increased the availability of radioactive X-ray and gamma-ray emitting materials in industry and nuclear medicine. As radioactive emission principally occurs outside of the visible part of the electromagnetic spectrum, an unaided human observer is unable to "see" a source of radioactive emission. It is difficult, therefore, to distinguish a source of X-ray and gamma-ray emission from non-emitting neighboring and visually similar objects. Various techniques exist to locate a source of radioactive emission. One technique requires trial and error search with a Geiger counter. Another technique uses a scintillation detector. The information provided by these techniques is limited to the intensity and general location of radioactive emission, and reveals nothing about the shape of the radioactive object, or the distribution of radioactivity within the object. An X-ray camera formed by placing X-ray sensitive film behind a pin hole in an X-ray shield provides a recording of a two-dimensional facsimile of an X-ray or gamma-ray emitting object in one perspective. The facsimile can be viewed after a delay for processing of the film. Furthermore, a single pin hole aperture camera is rendered extremely inefficient by the miniature aperture of the pin hole.

Other, existing X-ray or gamma-ray cameras employ either parallel, converging or diverging collimators to bring an essentially aligned beam projection of a radioactive object onto a detector. The detector may be in the nature of a film, a scintillator, or a phosphor material which converts X-rays and gamma-rays into visible light, or a combination of a scintillator and phosphor. The visible light generated, together with positional information, is then processed by any of a wide variety of methods using such devices as photo-multiplier tubes (e.g., Anger cameras), image intensifiers, visible light cameras, video cameras, and centroid-computing electronics in various combinations. Without the additional steps of making successive exposures and subsequent reconstructions, a particular object-to-camera geometry provides a two-dimensional single perspective image of an X-ray or gamma-ray emitting object.

Although versatile generally, the Anger camera provides course spatial resolution, and is physically large and expensive, all characteristics which make it disadvantageous in certain specific application areas. With complex centroiding electronic circuitry, an Anger camera is capable of providing images with spatial resolution on the order of 2 to 3 millimeters. An Anger camera enhanced by centroiding electronics must iteratively calculate the energy and position of each impinging gamma-ray, thereby necessarily incurring time delays which prevent the camera from processing images resulting from high rates of gamma-ray impingement with more than one hundred thousand events per second. The Anger camera suffers from dead-time during which its circuitry is unable to process and consequently loses, data about the images. Consequently, the performance and resolution of Anger cameras are limited substantially by their ancillary electronic circuitry.

Presently available Anger cameras have rather poor sensitivity for radioisotopes which emit either gamma-rays or X-rays with energies predominantly below 80 keV (kiloelectron volts) such as iodine-125, xenon-133 and thalium-201. Moreover, in dynamic studies of angiocardiography using the ultra short-lived radioisotopes such as irridium-191m with a half-life of 4.9 seconds, the gamma camera must be able to handle exceptionally high counting rates as well as provide high spatial resolution. In such cases energy information and large imaging area are not essential. The dead-times of a conventional Anger camera, is too long and the resolution too course for such applications.

An earlier invention, a low intensity X-ray image scope "Lixiscope" disclosed in U.S. Pat. No. 4,142,101 is a fully portable device which provides an intensified visible-light image of objects illuminated with point X-ray or gamma-ray sources (e.g. iodine 125 of between approximately 50 milliCuries or to 100 milliCuries or an X-ray generator) in real time. It uses an X-ray to visible-light convertor to drive a visible-light image intensifier having one or more microchannel plate electron multipliers. The Lixiscope provides a viewer with a visible shadow, in real time, of the X-ray or gamma-ray illuminated objects.

The Lixiscope requires either an X-ray generator or a radioactive source such as iodine 125, cadmium 109 or tin 119m to illuminate the object being viewed and thereby provide a shadow of that object upon a scintillator or rare-earth phosphor. The source, if radioactive, must be periodically replaced at times determined by the radioactive half-life of the source.

Applications for the Lixiscope are limited principally to the field of fluoroscopy or intensifier-assisted radiography by a need to insert the object (e.g. a human tooth or part of a human hand) between the source and the converter. Moreover, in practice, unless the Lixiscope views an object illuminated with a point X-ray or gamma-ray source, it is unable to provide a sharp image of the object's shadow. Consequently, the Lixiscope is unable to view extended sources of x-ray and gamma-ray emitting objects and therefore, is unsuitable for applications in the field of nuclear medicine where a low dosage of a radioactive isotope is introduced into the human body and reacts with particular anatomical organs to provide an extended object emitting X-rays and gamma-rays. Similarly, there is currently a need in industry for a device capable of forming visible light images of extended objects emitting X-rays, gamma-rays, and charged or uncharged particles, as well as a portable, hand-held device for scanning objects and detecting, and providing visible light images, of the sites of areas emitting radioactive emission.

STATEMENT OF THE INVENTION

Accordingly, it is an object of the present invention to provide a method and an improved device for converting X-ray and gamma-ray radiation into visible light images of the object emitting the radiation.

It is another object to provide an improved X-ray and gamma-ray imaging device capable of imaging objects emitting very low input radiation levels.

It is yet another object to provide an improved X-ray and gamma-ray imaging device capable of being made relatively small, lightweight, portable, inexpensive and battery powered.

It is still another object to provide an improved X-ray and gamma-ray imaging device having enhanced spatial resolution.

It is a further object to provide an imaging device capable of providing visible light images of extended sources of X-ray and gamma-ray emisions.

It is yet a further object to provide an imaging device suitable for viewing anatomical organ structures tagged with X-ray and gamma-ray emitting radioisotopes.

It is still a further object to provide an imaging device capable of providing visible images in real time and with a high degree of spatial resolution, of extended objects emitting X-ray and gamma-rays at high rates.

It is still yet a further object to provide an imaging device providing visible images of extended objects emitting X-rays and gamma-rays with energies below 80 Kev.

It is another object to provide an imaging device capable of forming visible light stereoscopic views of extended X-rays and gamma-ray emitting objects.

It is yet another object to provide an imaging device capable of forming visible light monoscopic or stereoscopically dynamic views of extended X-ray and gamma-ray emitting objects while the objects are in motion.

It is also an object to provide an improved method for forming visible light monoscopic and stereoscopic visible light images in real time, of extended objects emitting radiation.

These and other objects are achieved by passing X-ray and gamma-rays emitted from a radioactive object through a collimator, converting the aligned rays emerging from the collimator into visible light, intensifying the visible light and, either displaying the intensified visible light as real-time images or recording the visible light as images.

BRIEF DESCRIPTION OF THE DRAWINGS

A more complete appreciation of this invention, and many of the attended advantages thereof, will be readily apparent as the same becomes better understood by reference to the following detailed description when considered in conjunction with the accompanying drawings in which like reference symbols indicate the same or similar components, wherein:

FIG. 1A is a partial block diagram of a variation of the embodiment shown in FIG. 1.

FIG. 4 is a diagram showing an alternative embodiment of the present invention.

FIG. 4A is a plan diagram of a variation of the embodiment shown in FIG. 4.

DETAILED DESCRIPTION OF INVENTION

Figure 1:
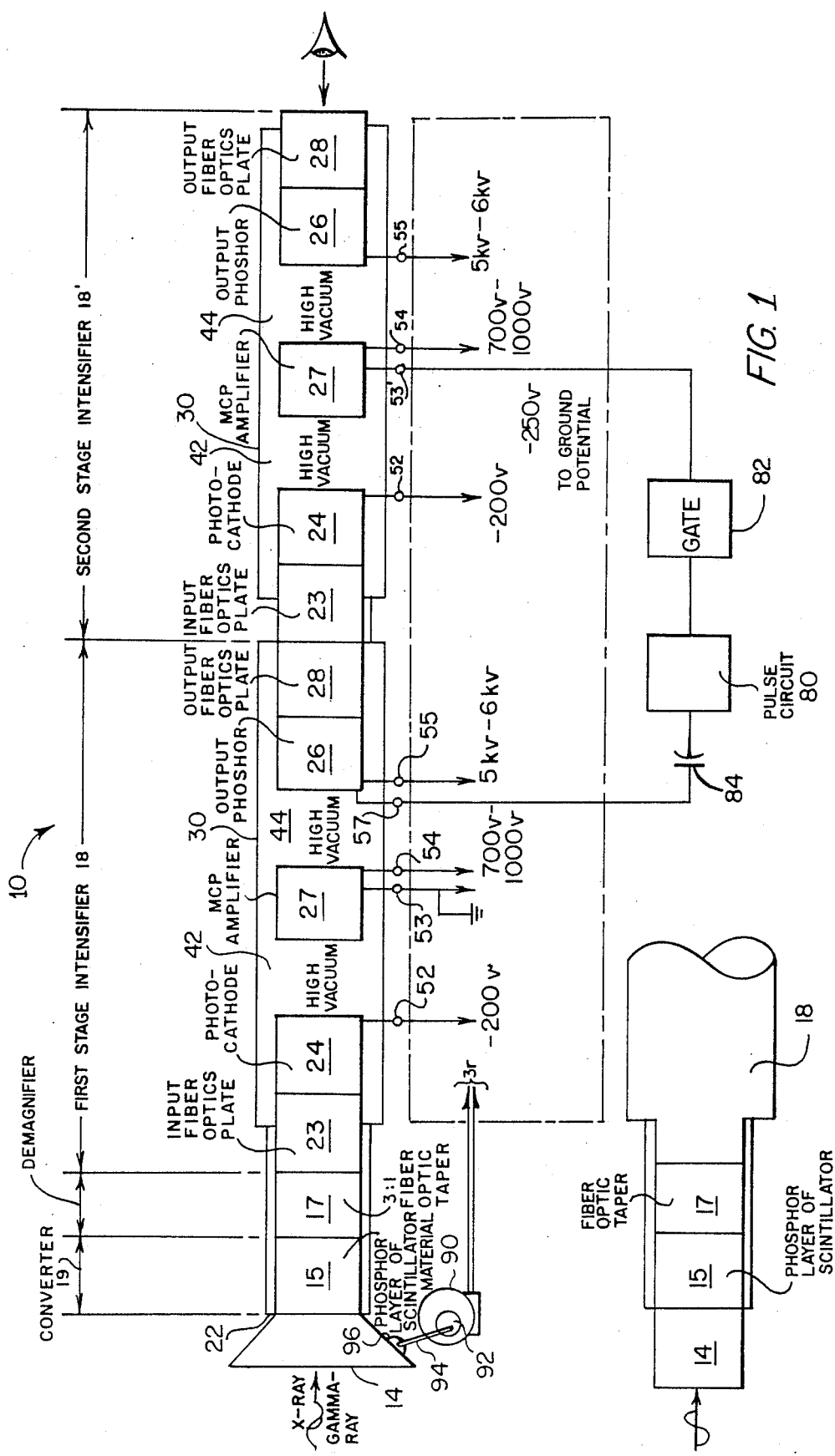
FIG. 1 is a block diagram showing the functional elements of one embodiment of the present invention.
Figure 2:
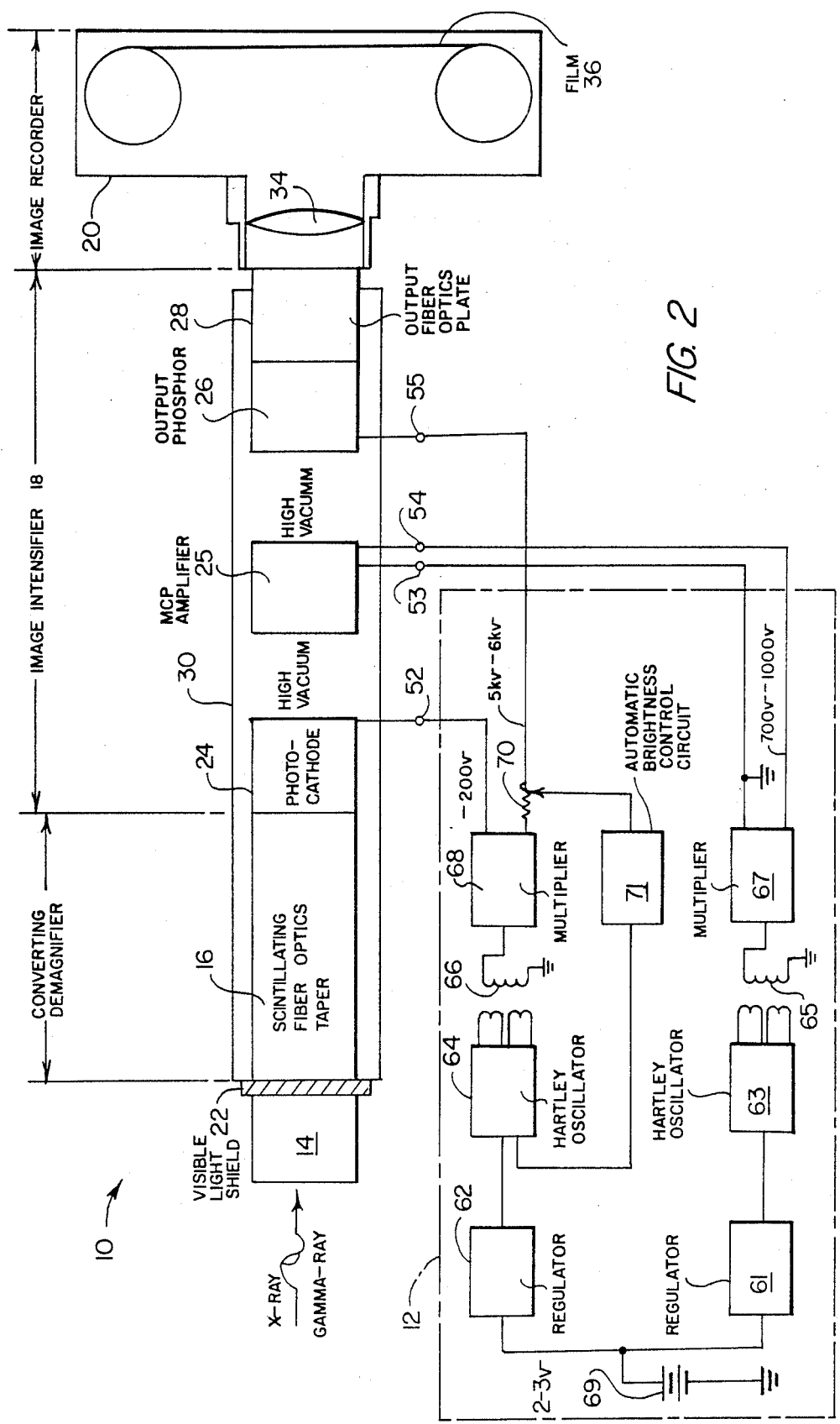
FIG. 2 is a block diagram showing the functional elements of an alternative embodiment of the present invention.

Referring now to the drawings, and to FIG. 1 in particular, the major functional elements of one embodiment of the present invention include an imaging device 10 and its ancillary electronic circuitry 12 (shown in greater detail in FIG. 2). The imaging device of this particular embodiment may be viewed as essentially composed of a collimator 14 for passing aligned rays of invisible radiation (e.g., X-rays and gamma-rays), a phosphor layer 15 of a scintillating material for converting rays transversing the passages of collimator 14 into visible light, a tapered fiber optic bundle 17, and a cascaded first and second stage image intensifiers 18, 18', respectively. In this embodiment, a collimator 14 is placed adjacent to an object emitting radiation such as X-ray photons or gamma-ray photons. Collimator 14 is essentially a plate made from a material of medium-to-high atomic number, such as lead or tungstun alloy, perforated with many converging holes similar to that of a honeycomb. The 3:1 ratio between the diameter of the entry face of collimator 14 exposed to incident radiation and the exit face adjoining visible light shield 22 provides demagnification of the object being viewed. Radiation traversing the lengths of the passages provided by those hole through collimator 14 and passing through visible light shield 22, strike a layer of scintillator material 15, which, in turn, generates visible light. Elements 15 and 22 constitute a converter section 19. An input fiber optics plate 23 forms a vacuum seal at one end of the high vacuum tube in which first stage intensifier 18 is contained. A fiber optic bundle 17 exhibiting a 3:1 ratio between an entry surface area adjoining scintillator 15 and an exit surface area adjoining plate 23 transmits visible wave length light emitting from converter 19 to plate 23, which, in turn, conveys the visible light to photocathode 24. Alternatively, either collimator 14 or fiber optic bundle 17 may be made with either parallel passages as shown in FIG. 1A providing passage for parallel aligned rays, or with passages diverging (e.g. in a small-to-large ratio of diameters providing magnification of the radiation emitting object) along the length between the entry and exit faces. Photocathode 24 converts the photons of the visible light to photoelectrons, which, in turn, are multiplied by a microchannel-plate (MCP) electron multiplying amplifier 27. Electrons eminating from amplifier 27 are thereafter converted back into visible light by an aluminized output phosphor layer 26. The visible light eminating from phosphor layer 26 is transported in the same spatial position as received from layer 26 by an output fiber optics plate 28 which also serves as a rugged vacuum seal for the end of intensifier tube 18 opposite to plate 23. Fiber optics plate 28 serves as a light pipe while maintaining the visible light spatial position of images formed by phosphor 26.

Second stage intensifier 18' is a high vacuum image intensifying tube which may be identical to first stage intensifying tube 18, or alternatively, may be an intensifier tube having a different amplifier 27 (e.g. a Z or a curved multichannel plate amplifier as disclosed in my U.S. Pat. No. 4,345,153) or may have either a different configuration of photocathode 24 or a different material for output phosphor 26. Pulse circuitry 80 (as described in my U.S. Pat. No. 4,345,153) may optionally be connected to the aluminized output layer 26 in the first stage while a gate 82 is connected between pulse circuitry 80 and MCP amplifier 27 of the second stage. In operation, pulse circuitry 80 may be set for a selected energy band. Normally, gate 82 will maintain the input of MCP amplifier 27 negative with respect to photocathode 24 of the second stage. With a negative MCP amplifier input, the photoelectrons will be repelled back to the photocathode, thereby cutting off the second stage. When pulse circuitry 80 senses, through capacitor 84, charged pulses of the proper pulse height for the aluminized output phosphor layer 26 in the first stage, gate 82 will allow the input of MCP amplifier 27 to go to a positive potential with respect to photocathode 24 which allows amplifier 27 to amplify photoelectrons eminating from photocathode 24 in the second stage. Thus, the visible light image occuring on output phosphor 26 and transmitted by fiber optics plate 28 of the second stage is formed only by X-ray or gamma-ray photons above a selected energy or within a selected energy band. It should be noted that the gating circuit 80–84 may easily be omitted to enhance the portability of image device 10; in such an instance, the voltages applied to the terminal pins 52, 53, 54 and 55 of second stage 18' will be identical to terminal pins 52–55 of first stage 18. This visible-light output image can be viewed directly, as shown in FIG. 1 or alternatively, recorded by an image recorder such as camera 20 shown in FIG. 2 or stored and analyzed as disclosed in my earlier mentioned U.S. Pat. No. 4,345,153.

Turning now to FIG. 2, a block diagram illustrates the major functional elements of an alternative embodiment, including an imaging device 10' and its ancillary electronic circuitry. The imaging device of this particular embodiment may be though of as essentially composed of a collimator 14 (with a 1:1 ratio between the diameters of its entry and exit surfaces) for passing parallel rays of invisible radiation (e.g., X-rays and gamma-rays), a converting demagnifier 16 coupled to the collimator for converting the rays of invisible radiation passing through the collimator into visible light which, in turn, drives a visible light intensifier 18 coupled to an image recording device 20 such as a commercially available single lens reflex camera. Converting demagnifier 16 also serves as the face plate and a vacuum seal for vacuum tube 30. A visible light shield 22 surrounds and completely encases all of converting demagnifier 16 except the exit surface adjoining photocathode 24, to block ambient visible light while providing virtually no shielding for X-rays or gamma-rays. Other dispositions of visible light shield 22, such as around the entry end and circumferential surfaces of vacuum tube 30, are possible.

Collimator 14 serves as an image-forming element. It is essentially a plate made from a material of medium-to-high atomic number, such as lead or a tungsten alloy perforated with many parallel, converging or diverging holes similar to that of a honeycomb. With a collimator 14 providing a plurality of holes with parallely aligned axes, only those X-rays or gamma-rays emitted parallel to the axes of the holes will completely traverse the holes through the length of the collimator. In one embodiment, seventy-five millimeter diameter, ten millimeter thick, parallel channel, multi-hole collimators were found to be particularly suitable. Collimators with two millimeter, and with two and one-half millimeter hexagon holes were found to be most useful in clinical applications. The presence of collimator 14 makes it possible to detect and form images of extended X-ray and gamma-ray emitting objects. Collimators with holes providing passages that diverge toward converter 16 serve to provide magnification of radiation-emitting objects while collimators with holes providing passages that converge toward converter 16 provide demagnification, thereby allowing imaging of objects larger than the field of view of a collimator with parallel passages. Preferably, collimator 14 is detachably mated to vacuum tube 30, thereby enabling a physician for example, to remove a collimator of a given resolution in exchange for another or to attach another collimator selected from among collimators with different ratios between entry and exit surfaces, the selected collimator providing a desired degree of demagnification (or, depending upon the particular application, magnification) of a radiation emitting object.

Converting demagnifier 16 is a fiberoptic plate made from scintillation optical fibers which not only transform aligned X-rays and gamma-rays which have traversed the lengths of the passages of collimator 14 into visible light, but also serve as light guides to prevent lateral spread of visible light produced by the X-rays and gamma-rays. Only those X-rays or gamma-rays emitted which are aligned with the directions of passages of collimator 14 are transformed by converter 16; positional correspondence between various points on the object emitting the rays of invisible radiation and the input face of photocathode 24 is thereby established. Scintilling fiber optic plates are commercially available and may be obtained from such manufacturers as Synergistic Detector Designs, 2438 Wyandotte Street, Mountain View, Calif. 94043. The photocathode converts the light transmitted to it by converter 16 into electrons, which, in turn, are multiplied by a micro-channel plate (MCP) electron multiplied 25. The electrons eminating from the MCP 25 are thereafter converted back to visible light by an output phosphor 26. The light generated by output phosphor 26 is transmitted by a fiber optics plate 28 to image recorder 20. The fiber optics structure of converter 16 and plate 28 serve two functions: conducting rays of light without spreading and providing a strong glass seal for the high vacuum which must be maintained within tube 30 which must be maintained around photocathode 24, MCP amplifier 25 and phosphor 26. Essentially, housing 30 is a vacuum tube.

With a twenty-five millimeter diameter MCP 25 and the same diameter photocathode 24, and a 3:1 ratio in the taper of the fiber optics end converter 16 between its collimator face end photocathode face, imaging device 10 may accommodate a seventy-five millimeter diameter collimator 14. In essence, this enables converter 16 to function as a demagnifier of radiation emitting objects with nine times the area of photo cathode 24. Conversely, with converter 16 oriented with a 1:3 ratio of the taper of its fiber optics between its collimator face and photocathode face, converter 16 can function to magnify radiation emitting objects lying within a focal plane having one-ninth of the surface area of photocathode 24. If desired, the 1:1 ratio between the diameter of the area of photocathode 24 and MCP multiplier 25 may be varied. For example, there can be a 3:1 ratio between the diameter of the area of photocathode 24 and MCP multiplier 25, either with or without a tapered fiber optics scintillator 16. Of course, the 3:1 ratio is not a fixed quantity but is used simply as means of an example; other ratios may be used to satisfy a particular requirement for magnification, demagnification, or combination of magnification and demagnification.

Photoelectrons emitted by photocathode 24 are focused onto MCP 25 either by proximity or by an electron lens, and are multiplied in the microchannel plate electron multiplier 25 by a secondary emission process. A typical MCP amplifier of twenty-five millimeter diameter contains over two million individual channels of twelve microns in diameter and four hundred and fifty microns in length. Each channel acts as a continuous dynode electron multiplier. There is absolute position registration between input and output faces of MCP 25 for each channel. The electrons multiplied within MCP 25 are further accelerated by a five kilovolt to six kilovolt fluorescent screen potential to provide additional intensity gain and convert the kinetic energy of the electrons into visible light, in the manner described in my U.S. Pat. No. 4,142,101. Output phosphor 26, a P-20 type, is directly coupled to fiber optic plate 28. The typical luminance gain of a second generation inverter tube suitable for use as intensifier 18 is between twenty thousand to seventy thousand. An image recorder 20 such as the single lens reflex 35 millimeter camera shown in FIG. 2, is positioned so that the visible light images of the radiation emitting object formed by phosphor 26 and transmitted by plate 28 are, in turn, transmitted by lens 34 and recorded on film 36 at the rear focal plane of camera 20.

Figure 3:
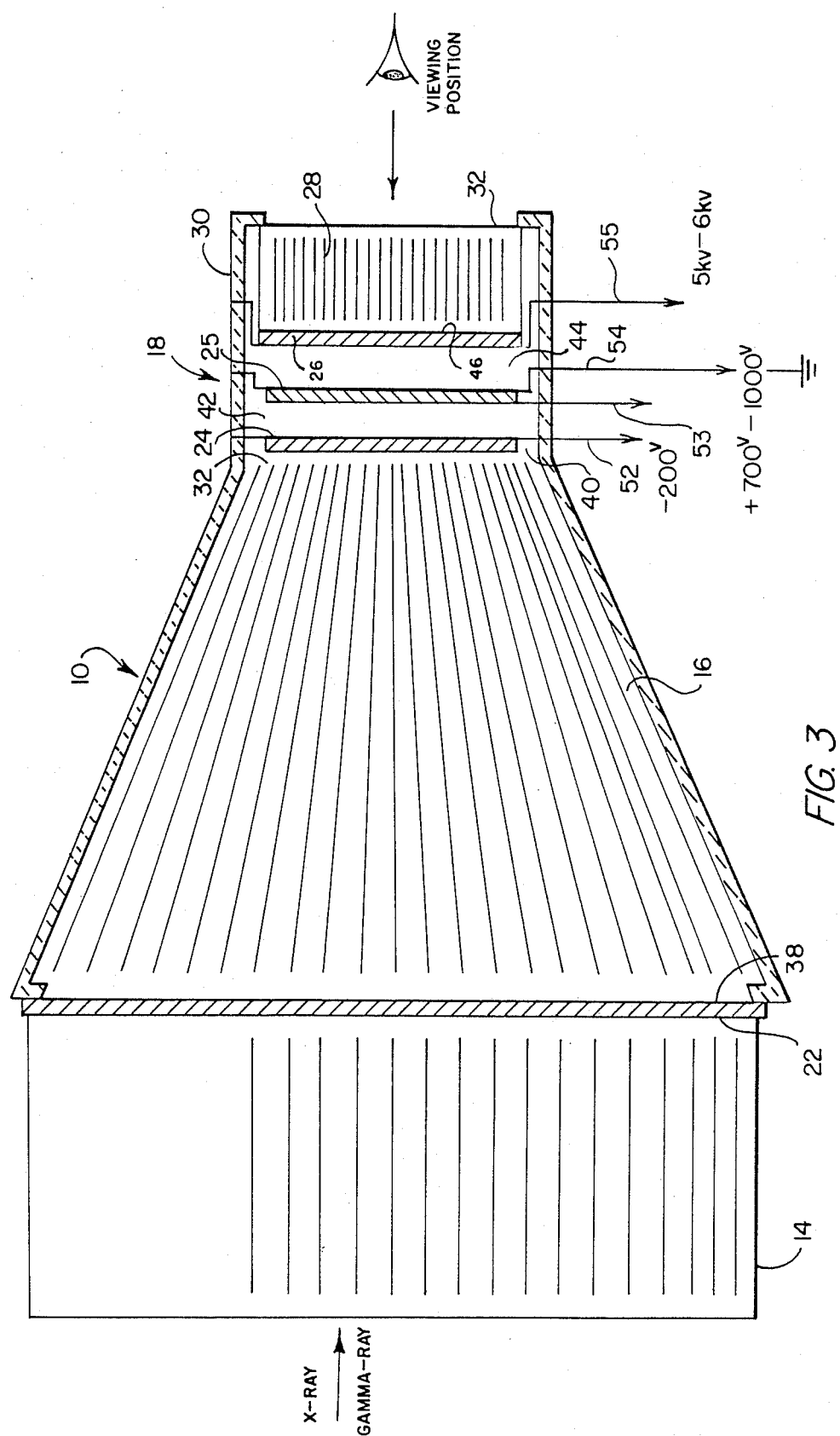
FIG. 3 is a detailed cross-sectional view of a portion of one embodiment, taken along a major axis.

Turning now to FIG. 3, a detailed cross-sectional diagram shows the converting demagnifier 16 and image intensifier 18 portions similar to those of the imaging device 10' previously functionally described in FIG. 2, along the major axis of the device. Elements 16 and 24–28 are contained within a housing 30 which may be round and formed of any compatible ceramic, glass or other insulating material suitable for electrical insulation and vacuum isolation. The parallel aligned rays of radiation transversing the lengths of passages provided by collimator 14 impinge upon light shield 22. This shield can be a thin aluminum or magnesium foil, or an equivalent low-Z opaque material suitable for blocking ambient visible light while being highly transparent to X-rays and gamma-rays. Alternatively, light shield 22 may be black plastic tape or a pin-hole free black paper. It must completely cover the adjoining entry face 38 of converting demagnifier 16, as well as the side surfaces of demagnifier 16.

Converting demagnifier 16 absorbs and converts each incoming radiation particle to a large number of visible light photons. Therefore, as long as any radiation is absorbed by converter 16, there is little probability of information being lost. In the converter demagnifier 16, the converting scintillation material is distributed throughout the lengths of the optic fibers. Alternatively, rare earth phosphors such as terbium activated 90% gadolinium and 10% lanthanum oxysulfide may be employed for X-ray and low-energy gamma-ray conversion with high efficiency. Such phosphors may alternatively be deposited on the entry surface of a demagnifier fiber optics plate without using scintillating materials inside of the fiber optics. If rare earth phosphors are deposited on entry face 38, then the optic fibers in demagnifier 16 need not contain scintillating materials. In addition, rare earth phosphors may be used for neutron imaging; however, for neutron imaging paraffin or borated materials could be used for collimators. Also, for high energy electron imaging, plastic scintillators may be used. The visible light image formed by the scintillating and tapered fiber optics of converter 16 is piped through the high vacuum chamber 40 by the five micron diameter fibers. The 3:1 ratio between the area of entry face 38 and exit face 32, thereby provides a demagnified visible light image to visible light photocathode 24. The diameters of the optical fibers forming converter 16 should be small enough so that system resolution degradation is minimal. The length, or plate thickness, of the fibers is not critical, but the ability to employ a thick plate without effecting operating characteristics endows device 10' with its rugged characteristics essential for troublefree portability. Loss of resolution is typically minimal due to the close coupling between the entry and exit faces 38, 32.

Visible light photocathode 24 is made with a material, for instance, S-20 chosen to closely match the visible light wave length of converter 16. Each incident radiation particle is therefore converted into a larger number of photoelectrons by photocathode 24. For proximity focusing, photoelectrons are accelerated by an approximately 200 volt potential difference across a 0.2 millimeter gap 42 to the adjacent entry of microchannel plate 25 which is constructed, in this case, with twelve micron inside diameter channels and a length to diameter ratio of approximately forty. The close proximity between photocathode 24 and the adjoining side of amplifier 25, together with the high electric field (1,000 volts per centimeter) experienced by the electrons eminating from photocathode 24, minimizes loss of resolution.

To achieve low noise operation and to prevent the contamination of photocathode 24, the large surface area of amplifier 25 with its millions of channels is thoroughly outgassed prior to sealing the intensifier portion in a high vacuum of approximately 10 nano-torrs. After the intensifier is sealed, it is used only as an integral unit.

MCP 25 is operated with 700 to 1,000 volts in an unsaturated mode with an average electron gain of approximately 1,000. It should be understood that when operated in the unsaturated mode with single electron inputs, amplifier 25 with straight channels has a gain distribution which is almost exponential in form. This kind of gain distribution contributes to the noise factor of the resulting image. When a large number of electrons are applied to amplifier 25, as is the case with this embodiment, the gain distribution tends to peak towards an average value, thus improving the quality of the resulting image. Furthermore, because each X-ray or gamma-ray generates a large number of photoelectrons, the probability of information loss is almost zero after the initial adsorption in converter 16.

Instead of using a basic MCP multiplier 25, a double MCP multiplier in a "chevron" configuration or a single MCP multiplier of large length-to-diameter ratios with curved channels, or a triple MCP in a "Z" configuration, all of which increase electron gains to between 1 million and ten million, with highly peaked gain distributions without ion feedback. Furthermore, the MCP multiplier employed may have increased diameters or have channels with conical inputs to diminish the inactive areas presently caused by the thickness of the channel walls.

The electrons eminating from multiplier 25 are accelerated by an approximate five to six kilovolt potential across a 1.3 millimeter gap 44, a field strength of about $4.6 \times 10^4$ volts per centimeter, and impinge on an aluminized phosphor screen 26 (e.g., a P-20) which is deposited as a layer on the interior face 46 of fiber optics plate 28. The aluminized phosphor prevents visible light feedback to photocathode 24. Phosphor 26 may have any phosphor which emits visible light with wave length and decay characteristics matched to the particular application desired (i.e. still or moving film recording, direct viewing with or without movement, or use with imaging devices). Fiber optics face plate 28 serves as a light pipe and maintains image resolution. It may be noted that both fiber optics converter 16 and fiber optics plate 28 also serve as vacuum seals. Additionally, plate 28 brings the final intensified visible light image onto a plane flush with the back surface of intensifier portion 18, thus making the device easily couplable with any form of image recording device such as photographic film in direct contact, the commercially available camera 20 shown in FIG. 2, as well as charge-coupled devices, camera, viewing lens, or for direct viewing. It may also be noted that although fiber optic materials in plate 28 are preferred as vacuum seals, they are not essential for operation. Thin planar glass may also be used, however planar glass is much more fragile.

Housing 30, as shown, is cylindrical, with all elements being generally cylindrical. Fiber optic converter 16 has a truncated conical shape providing a circular entry face 38. Fiber optics plate 16 serves as one vacuum seal while fiber optics plate 28 serves as a second vacuum seal at the opposite end of intensifier tube 18. Housing 30 contains photocathode 24, amplifier 25 and phosphorous screen 26 in a high vacuum. The converter, together with light shield 22, covers the radiation entry end of housing 30. Pins 52, 53, 54 and 55 protrude from housing 30 as electrical terminals to provide connections with power supply 12 shown in FIG. 2. Typically, photocathode 24 is at minus 200 volts, the input of amplifier 25 is grounded, the output of amplifier 25 is maintained between 700 and 1,000 volts, and phosphorous screen 26 is between 5 kilovolts and 6 kilovolts. Referring again to FIG. 2, ancillary electronic circuitry 12 depicts a block diagram for a power supply which may be used to power intensifier portion 18. Supply 12 includes two drive chains composed of regulators 61, 62, Hartley oscillators 63, 64, step-up transformers 65, 66 and multipliers 67, 68. Power supply 12 may be powered with a 2.0 to 3.0 volt source 69, such as a pair of "C" cells, thereby enabling imaging device 10 to be completely portable. Potentiometer 70 is placed in series with output phosphor screen 26. Since there is a very low current draw, the voltage to output phosphor screen 26 remains essentially constant. However, the variation in the voltage drop across potentiometer 70 becomes relatively large. This drop is fed back via an automatic brightness control circuit 71 to Hartley oscillator 63 to decrease its output level. This results in a lowering of the output voltage applied to amplifier 25, thereby decreasing its gain. By lowering the gain of amplifier 25, the screen of output phosphor 26 is dimmed and the screen is thereby protected from burning. Power supply 12 may be encased in silicone rubber or a similar protective material encapsulating all of the exterior surfaces of device 10' except the face of fiber optics converter 16 exposed to incident radiation and exit face 32 of fiber optics plate.

It should be noted that several state-of-the-art modifications may be made to device 10 as previously described to further enhance such characteristics of its performance as image quality. These modifications may include (1) a high resolution converter for special applications such as mammography; (2) using photocathodes which have their sensitivity peaked to match the wave length of the high-resolution converters; (3) providing output phosphors with various decay times and wave lengths for specific applications; and (4) using a taper ratio between the surface area of converter entry face 38 and exit face 32 tailored to assure an optimal degree of magnification or demagnification of the particular class of objects being viewed. Moreover, the inclusion of a tapered fiber optics bundle as a part of an imaging device is optional; the degree of demagnification, or magnification provided is determined by selection of the ratio (e.g., 4:1, 3.25:1, or 2.1:1) thought suitable for an intended use of the device.

Imaging device 10 can easily be made in a rugged configuration which is suitable for both field and clinical use. This is made possible because the device is constructed with an intensifier which may be operated under a high vacuum without any fragile windows. Moreover, the ability to power the device with small battery cells assures its light weight and portability.

The foregoing embodiments describe a miniature X-ray and gamma-ray camera in which a collimator serves as an element forming images of extended radiation emitting objects. It will be appreciated that all those changes and modifications which fall fairly within the scope of the inventions shall be apart thereof. For example, for extremely low-activity objects, the gamma camera exhibits essentially single gamma-ray or X-ray events. Therefore, an integrating device such as an integrating video cammera or a long-exposure photographic camera may be used to record visible light images occuring on plate 28. In either case, the recorded image may be digitized and manipulated by image-processing software for background substraction, edge and contrast enhancement, or for analysis and diagnoses.

Moreover, all of the alternative embodiments disclosed in my U.S. Pat. Nos. 4,142,101 and 4,345,153 concerning the imaging portion of the Lixiscope may be applied to the presently disclosed inventions. However, specific applications may dictate the choice of one embodiment over another. For example, when the X-ray or gamma-ray emititng object is of very low activity, maximum electron gain in the MCP amplifier is required to achieve single-event imaging. Therefore, multiple MCP (e.g. chevron or Z configuration), curved MCP or two single-MCP intensifiers in cascade, as shown in FIG. 1, either with or without pulse and gate circuitry, would be the preferred embodiment. In a well equipped environment where state-of-the-art electronics and computers are easily available, the embodiments mentioned in U.S. Pat. No. 4,345,153 with the Lixiscope providing energy discrimination in addition to spatial imaging may be preferable. In such application, a position sensitive anode, a charge coupled device, or a charge injection device camera, pulse-height electronics, energy windows, gating and coincidence circuitries, and image processing software can all be incorporated into any of the embodiments of the presently disclosed inventions. In essence, the embodiments disclosed are simplified and particularly suitable for portability. All of these embodiments provide high sensitivity below 80 KeV, fast response times and high spatial resolution, in a low cost, light weight and totally portable miniature gamma camera. Such embodiments are particularly suitable for nuclear medicine applications with the use of low-energy isotopes, and therefore provide an attractive complement to the conventional Anger camera. Other embodiments may include devices with tapered fiber optics bundles 17, or plates 23 or 28, either bent to a particular angle (e.g., 90 degrees), or twisted to provide for example, inversion of an image.

It is to be noted that the noun "pin hole" is used here to indicate an essentially non-defracting, non-focused X-ray, gamma-ray or visible-light aperture. The adjective "visible" and "invisible" refer, respectively, to whether or not the spectrum of the radiant electromagnetic energy discussed is normally discernible with unaided human vision. The nouns "light" and "light beam" are used to indicate radiant electromagnetic energy within the visible spectrum while the noun "ray" indicates radiant electromagnetic energy within the X-ray and gamma-ray region of the invisible spectrum.

The resolution provided by various ones of the embodiments disclosed in the foregoing paragraphs is so high that individual septa of the collimator can be seen. This may prove objectional to some users. One approach to overcoming the presence of septa in the visible image provided is to subject the collimator to gentle vibrations. In FIG. 1, for example, a motor 90, driven by a three volt potential difference derived from power supply 12 has an eccentric cam 92 mounted on its shaft. A connecting rod 94 is attached at one end to the eccentric, also off-center, and at its other end, to a lug 96 on the extension surface of collimator 14. As eccentric cam 92 is rotated by motor 90, rod 94 pulls and pushes collimator 14 on opposite sides of its major axis, thereby, gently vibrating collimator 14 and thus eliminating the fixed pattern image of its septa in the visible light image formed on fiber optics plate 28.

Although the embodiments described in the preceding paragraphs provide only a single visible light image, the invention disclosed may be practiced by providing stereoscopic images of an extended object emitting X-rays or gamma-rays. Stereoscopic images are obtainable either by recording two sequential images on film, for example with a slight movement between the object and the imaging device, or by using a pair of imaging devices, as shown in FIG. 4, to simultaneously provide a pair of visible light images in real time.

The pair of imaging devices shown in FIG. 4 are jointed together by a bridge 102 to provide a stereoscopic imaging device 11. Although as shown, the major axes 104 of each cascaded pair (not separately shown) of image intensifier vacuum tubes 18, 18' inside their respective housings 30, are aligned in parallel, the major axes 106 of the input stages formed by the collimator 14, phosphor 15, and if present, tapered fiber optic bundle 17, and input fiber optics plate 23 are displaced at angles $\theta$ from respective major axes 104, because it is desirable, to obtain an image providing a sensation of depth from the two cameras forming device 11, to place the collimator close to the emitting object so as to make the most efficient use of the invisible radiation emitted by the object. Therefore, to assure the occurrence of stereoscopic views from an object located immediately adjacent to collimators 14, with a concomitant sensation of depth, axes 106 are displaced inwardly from major axes 104, by bending either input fiber optics plate 23, or if present, tapered fiber optics bundle 17, to give the required displacement angles. This allows the field of view of each camera to overlap, as indicated by the shaded area in FIG. 4A. Alternatively, major axes 104, 106 may be coaxial for each camera, with either one or both fiber optic plates 23, 28 being bent, or as shown in FIG. 4A, by the addition of output visible light optics (e.g. lens 110, and mirrors 112, 114) providing a pair of visible light images at eyepieces 116. In both the embodiments of FIG. 4 and FIG. 4A, for direct viewing, the distance between output plates 28, or between eyepieces 116, should approximately equal the distance between the eyes of a human observer.

The occurrence of stereoscopic views, with the concomitant sensation of depth, is obtainable with the present invention because of its small format (i.e., narrow field-of-view). This is a feature not obtainable from currently available large imaging devices. Moreover, it may also be noted that stereoscopic devices are obtainable with the present invention in fields such as nuclear medicine for example, without subjecting a patient to additional doses of radiation.

Although the inventions disclosed are not limited to construction of an imaging device with a 1:1 ratio between the surface areas of the photocathode and MCP multiplier the foregoing detailed description used a 1:1 ratio solely to simplify the description and thereby facilitate an understanding of the principles of the inventions disclosed. These variations can be combined, if desired, with selected arrangements of ratios between the entry and exit surfaces of collimators and fiber optic tapered bundles. Although the embodiments disclosed contemplate using currently available image intensifier tubes, the use of other tubes such as one substituting a tapered fiber optics bundle 17 for input plate 23 is feasible in the practice of these inventions.

I claim:
1. An apparatus for converting images of radiation emitting objects into visible light images, comprising:
    means for providing at an exit face a plurality of aligned rays of invisible radiation from an extended radiation emitting object;
    means including a microchannel plate image intensifier tube, for visible light intensification; and
    input means having a continuous entry surface disposed coextensively with said exit face for receiving all of said aligned rays, for converting said plurality of aligned rays into visible light and for coupling said aligned ray providing means and said visible light intensification means.

2. The apparatus of claim 1, wherein said input means provides a plurality of conduits for passage of said visible light.

3. The apparatus of claim 2, wherein said plurality of conduits converge toward said visible light intensification means.

4. The apparatus of claim 3, wherein:
    said aligned ray providing means comprising a multi-channel collimator having a multiplicity of passages for passage of said radiation towards said input means; and
    said passages converge toward said input means.

5. The apparatus of claim 2, wherein said plurality of conduits diverge towards said visible light intensification means.

6. The apparatus of claim 5, wherein:
    said aligned ray providing means comprises a multi-channel collimator having a multiplicity of passages for passage of said radiation towards said input means; and
    said passages diverge toward said input means.

7. The apparatus of claim 1, wherein said aligned ray providing means comprises a multi-channel collimator having a multiplicity of passages for passage of said radiation.

8. The apparatus of claim 7, further comprised of means for vibrating said collimator.

9. The apparatus of claim 2, wherein said passages converge towards said input means.

10. The apparatus of claim 2, wherein said passages diverge towards said input means.

11. The apparatus of claim 1, wherein said aligned ray providing means comprises a first and a second spaced-apart multi-channel collimator each having a multiplicity of passages for passage of said radiation, said first and second collimators each defining different first major axes;

said visible light intensification means comprises a first and a second visible light intensifier disposed in a spaced-apart relation with each said intensifier defining spaced-apart second major axes; and said input means comprises a first and second spaced-apart means for providing said coupling between respective ones of said first and second collimators and corresponding ones of said first and second visible light intensifiers, whereby said first and second intensifiers provide stereoscopic visible light images of said object.

12. The apparatus of claim 11, wherein said first major axes intersect one another within a field of view common to said first and second collimators, further comprising:

first and second viewing means coupled to respective ones of said first and second light intensifiers, for providing said stereoscopic visible light images, said first and second viewing means defining parallel third major axes intersecting said first major axes.

13. The apparatus of claim 11, wherein said first major axes intersect one another within a field of view common to said first and second collimators, and each of said first major axes is coaxially aligned with a corresponding one of said second major axes.

14. The apparatus of claim 11, wherein said first major axes intersect one another within a field of view common to said first and second collimators, and each of said first major axes transverse corresponding ones of said second major axes.

15. The apparatus of claim 11, further comprised of first and second spaced-apart viewing means coupled to respective ones of said first and second light intensifiers, for providing said stereoscopic visible light images, said first and second viewing means defining third major axes.

16. The apparatus of claim 15, wherein said third major axes are parallel and are spaded apart by a distance approximately equal to the separation between the eyes of a human observer.

17. The apparatus of claim 1, further comprised of means for vibrating said aligned ray providing means.

18. The apparatus of claim 1, wherein said visible light intensification means comprises a first microchannel plate image intensifier tube cascaded into a second microchannel plate image intensifier tube.

19. The apparatus of claim 1, wherein said microchannel plate image intensifier tube includes a double microchannel plate.

20. The apparatus of claim 1, wherein said microchannel plate image intensifier tube includes a triple microchannel plate.

21. The apparatus of claim 1, wherein said microchannel plate image intensifier tube includes a microchannel plate having curved channels.

22. The apparatus of claim 1, further comprised of a power supply providing electrical energy to operate said visible light intensification means, said power supply being powered by a pair of flashlight battery cells.

23. An apparatus for converting images of radiation emitting objects into visible light images, comprising:

means for providing at an exit face a plurality of aligned rays of invisible radiation from an extended radiation emitting object;

means having a single and continuous entry surface disposed coextensively with said exit face for receiving all of said aligned rays, and for converting said aligned rays of radiation into visible light;

means including a microchannel plate image intensifier tube, for visible light intensification; and means for light coupling said converting means and said visible light intensification means.

24. The apparatus of claim 19, wherein said light coupling means provides a plurality of conduits for passage of said visible light.

25. The apparatus of claim 24, wherein said plurality of conduits diverge towards said visible light intensification means.

26. The apparatus of claim 25, wherein:

said aligned ray providing means comprises a multichannel collimator having a multiplicity of passages for passage of said radiation towards said input means; and said passages diverge toward said input means.

27. The apparatus of claim 21, wherein said plurality of conduits converge toward said visible light intensification means.

28. The apparatus of claim 27, wherein:

said aligned ray providing means comprises a multichannel collimator having a multiplicity of passages for passage of said radiation towards said input means; and said passages converge toward said input means.

29. The apparatus of claim 23, wherein said aligned ray providing means comprises a multi-channel collimator having a multiplicity of passages for passage of said radiation.

30. The apparatus of claim 29, further comprised of means for vibrating said collimator.

31. The apparatus of claim 20, wherein said passages converge towards said light coupling means.

32. The apparatus of claim 20, wherein said passages diverge towards said light coupling means.

33. The apparatus of claim 23, wherein:

said aligned ray providing means comprises a first and a second spaced-apart multi-chanel collimator each having a multiplicity of passages for passage of said radiation, said first and second collimators each defining different first major axes;

said converting means comprises separate and spaced apart first and second said converting means each individually disposed coextensively with a different exit face of respective ones of said first and second collimators;

said visible light intensification means comprises a first and a second visible light intensifier disposed in a spaced-apart relation with each said intensifier defining spaced-apart second major axes; and said light coupling means comprises first and second spaced apart fiber optic means for providing said coupling between respective ones of said first and second converting means and corresponding ones of said first and second visible light intensifiers, whereby said first and second intensifiers provide stereoscopic visible light images of said object.

34. The apparatus of claim 33, further comprised of first and second spaced-apart viewing means coupled to respective ones of said first and second light intensifiers, for providing said stereoscopic visible light images, said first and second viewing means defining third major axes.

35. The apparatus of claim 34, wherein said third major axes are parallel and are spaced-apart by a distance approximately equal to the separation between the eyes of a human observer.

36. The apparatus of claim 33, wherein said first major axes intersect one another within a field of view common to said first and second collimators, further comprising:
first and second viewing means coupled to respective ones of said first and second light intensifiers, for providing said stereoscopic visible light images, said first and second viewing means defining parallel third major axes intersecting said first major axes.

37. The apparatus of claim 33, wherein said first major axes intersect one another within a field of view common to said first and second collimators, and each of said first major axes is coaxially aligned with a corresponding one of said second major axes.

38. The apparatus of claim 33, wherein said first major axes intersect one another within a field of view common to said first and second collimators, and each of said first major axes transverse correponding ones of said second major axes.

39. The apparatus of claim 23, further comprised of means for vibrating said aligned ray providing means.

40. The apparatus of claim 23, wherein said visible light intensification means comprises a first microchannel plate image intensifier tube cascaded into a second microchannel plate image intensifier tube.

41. The apparatus of claim 19, wherein said microchannel plate image intensifier tube includes a double microchannel plate.

42. The apparatus of claim 23, wherein said microchannel plate image intensifier tube includes a triple microchannel plate.

43. The apparatus of claim 23, wherein said microchannel plate image intensifier tube includes a microchannel plate having curved channels.

44. The apparatus of claim 23, further comprised of a power supply providing electrical energy to operate said visible light intensification means, said power supply being powered by a pair of flashlight battery cells.

45. An apparatus for converting images of radiation emitting objects into visible light images, comprising:
a multi-channel collimator having a multiplicity of passages in an ordered array providing, at an exit face, rays of invisible radiation from an extended radiation emitting object;
shielding means adjoining said exit face for allowing passage of said rays while restricting passage of light visible to the human eye;
intermediate means having a single and continuous entry face disposed coextensively with and separated by said shielding means from said exit face, for receiving all of said rays passing through said exit face and said shielding means, and for converting said rays of radiation into visible light; and
means including a first microchannel plate image intensifying tube having first input fiber optics conveying said visible light from said intermediate means to a photocathode, and a second microchannel plate image intensifying tube cascaded with said first microchannel plate image intensifying tube and having second fiber optics directly conveying invisible light from said first microchannel plate image intensifying tube to another photocathode, for providing visible light images.

46. The apparatus of claim 45, wherein said intermediate means comprises a layer of scintillating material.

47. The apparatus of claim 46, further comprising third fiber optics providing an entry surface area receiving the visible light from said scintillating material and an exit surface area adjoining said first fiber optics, the areas of said entry surface area and said exit surface area being substantially different.

48. The apparatus of claim 45, wherein said intermediate means comprises third fiber optics providing an entry surface area receiving the visible light from said intermediate means and an exit surface area adjoining said first fiber optics, the areas of said entry surface area and said exit surface area being substantially different.

49. An apparatus for converting images of radiation emitting objects into stereoscopic visible light images, comprising:
means having a multiplicity of passages for providing at first and second exit faces, two groups of rays of invisible radiation emanating from two different and partially overlapping views of an extended radiation emitting object;
said providing means defining a first major axis with said first exit face and defining a second major axis with said second exit face, said first and second major axes intersecting within a field of view of said ray providing means;
shielding means adjoining said ray providing means for allowing passage of said rays while restricting passage of light visible to the human eye;
first intermediate means having a single and continuous entry face disposed coextensively with a first one of said exit faces, for converting into visible light all of said rays emanating from said object within a first one of said views and passing through said first exit face and said shielding means;
second intermediate means having a single and continuous entry face disposed coextensively with a second one of said exit faces, for converting into second visible light all of said rays emanating from said object within a second one of said views and passing through said second exit face and said shielding means;
first means including a first microchannel plate image intensifying tubes having first input fiber optics conveying said visible light from said first intermediate means to a photocathode, for providing visible light images along a third axis; and
second means including a second microchannel plate image intensifying tube having second input fiber optics conveying said visible light from said second intermediate means to a photocathode, for providing visible light images along a fourth axis spaced apart from said third axis.

50. The apparatus of claim 49, wherein said first and second intermediate means comprises layers of scintillating material.

51. The apparatus of claim 50, further comprising third and fourth fiber optics each providing an entry surface area respectively receiving the first visible light and the second visible light from said scintillating material and an exit surface area respectively adjoining said first and second fiber optics, the areas of said entry surface areas being substantially different from the areas of said exit surface areas.

52. The apparatus of claim 49, wherein said first and second intermediate means each comprise third and fourth fiber optics each providing an entry surface area respectively receiving the first visible light from said first intermediate means and said second visible light from said second visible means, and exit surface areas adjoining respective ones of said first and second fiber optics, the areas of said entry surface areas being substantially different from the areas of said exit surface areas.

* * * * *